LeRoy W. Kruckman
INVENTOR
BY
Kolisch + Hartwell
Attys.

3,412,819
TRANSPORTATION SYSTEM INCLUDING
ELECTRIC VEHICLE
Le Roy W. Kruckman, Rte. 1, Box 42,
Newberg, Oreg. 97132
Filed Oct. 14, 1966, Ser. No. 586,734
2 Claims. (Cl. 180—2)

ABSTRACT OF THE DISCLOSURE

A transportation system comprising an electrically powered dirigible vehicle which includes an electric motor and a power train connecting the motor to ground-traveling devices on either side of the vehicle. The power train includes a shuttle clutch disposed between the electric motor and steering clutches for the two ground-traveling devices, which is adjustable to produce forward and reverse operation of the vehicle. Electric power for the motor is derived from a flexible conductor anchored at an elevated point and extending in a suspended reach downwardly to the vehicle, with such reach suspended over the surface which supports the vehicle.

---

This invention relates to a transportation system including an electric vehicle. More particularly, the invention concerns a system wherein the vehicle receives the energy powering it from an external source connected to the vehicle by a flexible conductor line.

Certain operations which may be performed in the open are readily carried out with vehicle aids powered by internal combustion engines. However, where there is any confinement of the region where such vehicles operate, the gaseous combustion products given off from such engines can be a serious problem. Blower systems may be used to alleviate the problem, but these require attention in setting them up and may not have sufficient capacity to remove the gases to the extent desired. With an electrically-powered vehicle, such combustion products are not produced, however, the usual unit of this description has relied upon storage batteries for the supply of electricity. The unit requires considerable maintenance, can operate for only a limited time without recharging of the batteries, and has various other disadvantages.

Generally, an object of this invention is to provide an improved transportation system which features an electrically-powered vehicle and a novel, suspended, flexible conductor line connecting the vehicle to an external electrical supply. The transportation system is a practical answer to the various problems outlined above which are confronted when load handling is to be performed in a confined space.

More particularly, this invention contemplates an electrically-powered vehicle, with a flexible conductor line supplying the current for powering the vehicle, where such line by means of a novel biasing system and elevated anchoring connection remains suspended in a depending reach extending from the elevated anchoring connection to the vehicle. The vehicle includes dirigible vehicle supporting means supporting the vehicle for movement over a surface, the vehicle thus being fully maneuverable within the region where the same is to operate. With the depending reach of the conductor line described maintained suspended by the biasing means, the line which supplies the current is kept out of the way of the vehicle while the vehicle is maneuvered.

A related object is to provide, in such an organization, novel means for anchoring the upper extremity of such a reach of conductor line, which means inhibits wearing of the line and isolates the tension in the depending reach of the line whereby the line may extend in a relatively untensed state to a connection with an electrical supply.

The usual source of electrical current in this country supplies alternating current, and it is common for motors driven by an alternating current to have optimum performance while running at a substantially constant speed. The transportation system of the invention, therefore, further contemplates a novel transmission system in the vehicle connecting such an electrically energized motor to the driving member or members propelling the vehicle, facilitating control of the direction and speed of the vehicle. In this connection, a shuttle clutch is contemplated having a neutral position, which is adjusted to either side of this position to produce a change in vehicle direction. Stopping the vehicle, or causing it to move forward or backward, is thus fully controllable by the operator through adjustment of the shuttle clutch. The vehicle further includes a change speed transmission to produce changes in speed ranges in the vehicle.

The invention as described herein concerns apparatus employable for loading or unloading the hold of a ship. Circulation of air in such a hold is restricted, and the employment of a vehicle powered by means not producing noxious combustion products is therefore highly desirable. Further, by extending the flexible conductor line to the vehicle through the hatch opening which normally provides access to a hold, an elevated anchoring connection for such line is readily provided, with such line then extending in the suspended reach described from the hatch opening to the vehicle below. While a specific embodiment of the invention has been described, it should be understood that such is for purposes of illustration, and it is not intended thereby to limit the invention in all respects to the details set forth for such specific embodiment.

These and other objects and advantages are attained by the invention, and the same is described hereinbelow in conjunction with the accompanying drawings, wherein.

Figure 1:
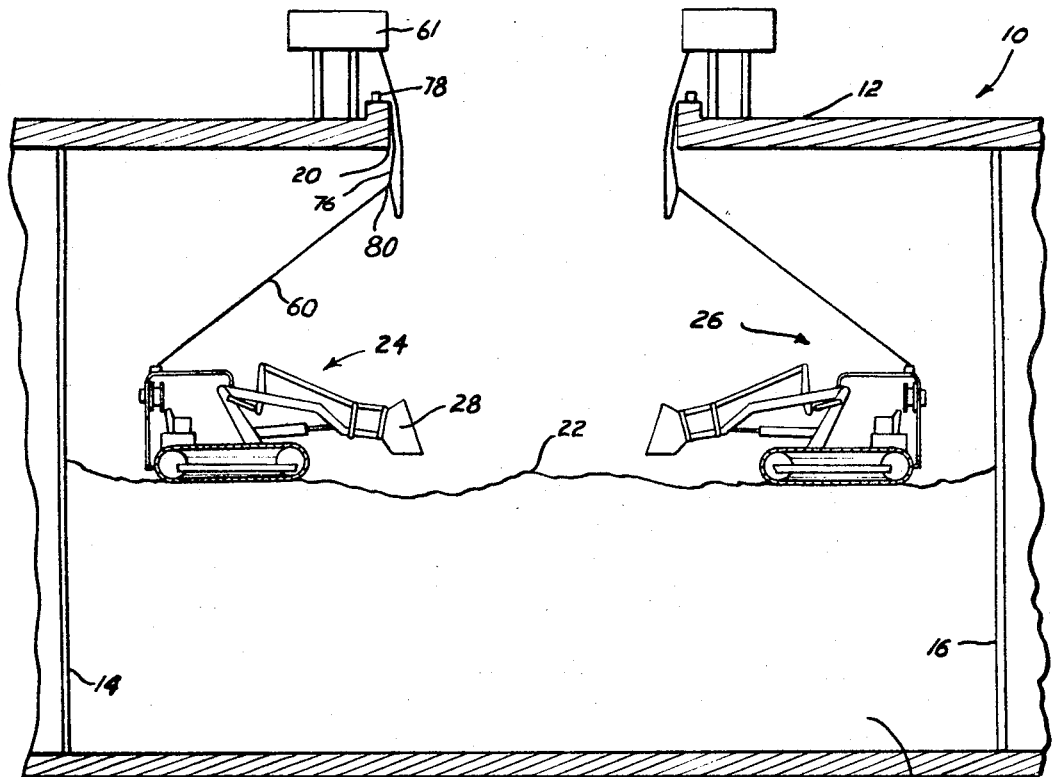
FIG. 1 is a cross-sectional view, in somewhat simplified form, illustrating in outline the hold of a ship, and showing a pair of vehicles as part of the transportation system contemplated disposed within such hold, for the handling of bulk material deposited in the hold.
Figure 2:
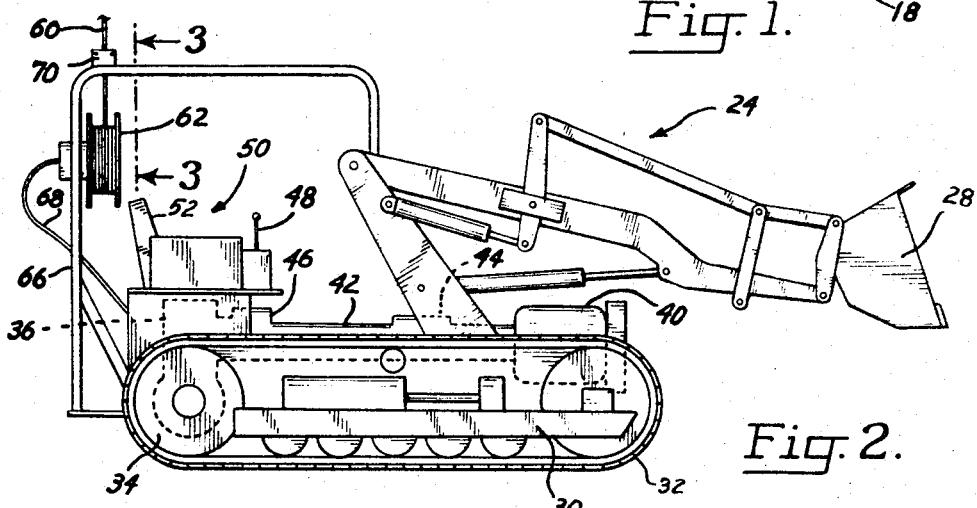
FIG. 2 is a view, slightly enlarged, illustrating further details of such vehicle.

Referring now to the drawings, 10 indicates portions of a ship including a deck 12 and side bulkheads 14, 16 outlining within the ship a hold, shown generally at 18. Providing access into the hold from the top is a hatch opening 20. The hatch normally closing such opening is shown removed, as would be the case when filling the hold with bulk material of the type which fills the hold to the level outlined at 22.

In filling the hold with such bulk material, it has been found practicable to move the material about as the same is introduced, to produce proper distribution. Such material handling is facilitated using vehicles, such as the crawler tractors designated at 24 and 26 in FIG. 1. These units may be provided with a power-operated shovel or bucket, such as that shown at 28, or other load-handling apparatus, permitting the picking up and transferring of material.

In the transporting of such material, it should be obvious that optimum efficiencies result if the vehicles are fully maneuverable, including being directable toward various regions within the hold and being movable in forward and reverse directions. As the level of the material within the hold changes during the loading, it should further be obvious that the level of the surface which supports the vehicles will change. The transportation system of the invention contemplates an organization which permits such full maneuverability in the vehicles, and accommodates such changing in the level of the supporting surface over which the vehicles operate.

Considering now in more detail the construction of a vehicle, in the embodiment of the invention illustrated such comprises the usual vehicle frame 30 with endless tracks, such as that shown at 32, present on opposite sides of the vehicle frame which support the vehicle, and constitute vehicle supporting means in the construction. Each track may run about sprockets, such as sprocket 34, which is a driving member in the construction rotated under power to produce revolving of the tracks and propelling of the vehicle. Associated with each track, and indicated at dashed outline at 36, is a steering clutch disposed in the power train in the vehicle between sprocket 34 and the prime mover for the vehicle, (to be described in detail later). The steering clutches for the tracks are adjustable, independently of each other. This, therefore, enables the vehicle to be steered in a conventional manner. The vehicle, therefore, falls broadly within the category of a dirigible vehicle, and the vehicle supports comprise dirigible vehicle supports.

As contemplated by this invention, the vehicle is propelled under power by energizing an electric motor, such as the AC motor shown generally at 40 located adjacent the forward end of the vehicle frame. Motor 40 is connected through power-transmitting mechanism, shown at 42 and through the steering clutches described, to sprockets 34. Power-transmitting mechanism 42 includes a change speed transmission, illustrated generally by the outline 44, adjustable by the operator to effect a change in the speed range at which the vehicle travels. A motor operating from a supply of alternating current is preferable, since most electrical sources supply an alternating form of electrical current. As is common with conventional AC motors, when operating most efficiently they tend to be running at a substantially constant speed. The change speed transmission 44 permits a control of speed ranges while maintaining this substantially constant running speed in motor 40.

Also part of power-transmitting mechanism 42 is a multiple disc shuttle clutch, shown generally at 46, which is in the power train between change speed transmission 44 and the two steering clutches 36 provided on either side of the vehicle. The shuttle clutch is operated by a handle, shown at 48, to adjust it from a neutral position (where the clutch discs within the clutch are out of engagement) either to a forward or to a reverse position (producing forward or reverse operation of the vehicle). With the shuttle clutch, and assuming a given speed range selected by the change speed transmission, the vehicle may be stopped (by placing the clutch in its neutral position) or made to go forward or in a reverse direction, at a speed determined by the setting of transmission 44. In starting up, the discs of the clutch are gradually engaged, to produce gradual acceleration of the vehicle.

The vehicle is provided adjacent the rear thereof with an operator's station 50 including a seat 52. Not shown, but also part of the vehicle are the usual controls for regulating the change speed transmission, the steering clutches, and the operation of bucket mechanism 28.

Power to operate motor 40 is supplied the motor through an elongated flexible conductor line 60, containing the usual electrical conductors forming a circuit with an electrical source, shown at 61. Portions of the conductor line are stored as windings or coils on the drum of a spring-biased reel 62. The reel is mounted on a bracket 64 joined to post structure including posts 66 which extend upwardly from the vehicle frame and form a protective canopy for the vehicle operator. It will be noted that the reel is located at a relatively high elevation on the posts. Extending from the hub of the reel to the vehicle is a conductor line 68 completing an electrical connection between conductor line 60 and motor 40.

Progressing from the drum of reel 62, conductor line 60 extends upwardly and thence through fair lead means 70 mounted on the post structure above the reel. This fair lead means includes rollers 72 journaled thereon which guide the flexible conductor line up through the fair lead means while providing relatively low-friction contact therewith. Because of the elevation of means 70, the line emanates from the vehicle at a point well above an operator's head.

As will be apparent from what has been described so far, on a vehicle being maneuvered within the hold the same will be caused to be moved back and forth on the surface of the material being handled, with the general level of this material changing as additional amounts of material are loaded. This invention contemplates an organization wherein conductor line 60 extends from supply 61 through the hatch opening, and thence, progressing to the fair lead means on the vehicle, hangs suspended above the surface traversed by the vehicle whereby it can't be damaged by the vehicle traveling over the line. Further contemplated is structure maintaining sufficient tension in the line to result in its being maintained suspended, regardless of vehicle movement or a change in vehicle elevation. Further, the provision of anchoring means attached to the line adjacent the top extremity thereof serves to isolate the tension in the line from that portion of the line which extends to a connection in the line with the AC supply.

More specifically, shown at 76 is an elongated flexible anchoring member, which may be a cord or other flexible line, secured to the ship adjacent the hatch opening at 78. The opposite end of this line is secured to the conductor line at 80. Between the point of connection of line 76 with line 80 and the AC supply, the conductor line hangs loosely and relatively free of tension. The flexibility in line 76 enables the point of connection with the conductor line to swing in a circular arc slightly below the hatch opening. During such swinging movement the upper portion of the conductor line remains relaxed.

Figure 3:
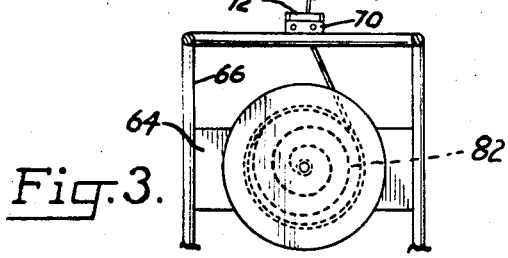
FIG. 3 is a view, still further enlarged, taken generally on the line 3—3 in FIG. 2.

Progressing from the point of connection of the anchoring line with the conductor line, the conductor line extends in a relatively taut state to the fair lead means and thence to the drum of reel 62. As can best be seen in FIG. 3, shown at 82 is a spring which biases the drum to cause the same to rotate in a direction taking up slack in the conductor line. The biasing action of the spring produces tension in the line sufficient to maintain the line off the surface supporting the vehicle and elevated above the vehicle.

With the apparatus as contemplated, it will be apparent that full maneuverability is permited the vehicle. With the vehicle moved directly under the anchoring line or away from it, the conductor line is taken in or paid out, as necessary. The anchoring member isolates tension in the lower part of the line from that part of the conductor line which connects with the AC supply, preventing the conductor line from being pulled free of its connection with the supply. The vehicle may operate continuously by reason of the established connection with the external source of electricity. By electrically powering the vehicle, the vehicle is enabled to perform its different work operations without the production of noxious fumes. Control of the vehicle in its speed and direction is highly flexible.

While an embodiment of the invention has been described, it is obvious that changes and variations are possible without departing from the invention. For instance, other vehicles besides those equipped with bucket or shovels as described are possible, as well as vehicles differing in other details. It is intended to cover all such modifications and variations of the invention as would be apparent to one skilled in the art, and that come within the scope of the appended claims.

It is claimed and desired to secure by Letters Patent:

1. A transportation system comprising a dirigible vehicle including a vehicle frame and ground-traveling means on each side of the vehicle frame supporting the vehicle for movement over the ground; a pair of driving members, one for each ground-traveling means, each of which is rotatable and is operatively connected to its associated ground-traveling means whereby on rotation of the driving member its associated ground-traveling means moves to propel the vehicle; an electric motor mounted on the vehicle frame; a power train connecting said motor and said driving members including a shuttle clutch adjustable to produce forward and reverse operation, said shuttle clutch being between the motor which is on one side of the shuttle clutch and the two driving members which is on the opposite side of the shuttle clutch; and an elongated conductor line for supplying electric power to operate the motor, said conductor line including a reach depending from an elevated point which extends downwardly to the vehicle and which is suspended over the surface supporting the vehicle whereby it does not impair steered movement of the vehicle.

2. The vehicle of claim 1, wherein said power train further comprises a change speed transmission located between said electric motor and said pair of driving members which is adjustable to change the speed range at which the vehicle is propelled.

References Cited

UNITED STATES PATENTS

| | | | |
|---|---|---|---|
| 1,423,889 | 7/1922 | Townsend | 191—12 |
| 1,681,385 | 8/1928 | Avera | 191—12 |
| 1,796,418 | 3/1931 | Wyman | 191—12 X |
| 2,197,289 | 4/1940 | Baker et al. | 180—6.7 |
| 2,597,615 | 5/1952 | Brown. | |
| 3,136,435 | 6/1964 | Vickers | 191—12 X |
| 3,231,117 | 1/1966 | Melroe et al. | 180—6.6 X |
| 3,294,187 | 12/1966 | Ruf | 180—6.66 |

FOREIGN PATENTS

| | | |
|---|---|---|
| 26,348 | 1909 | Great Britain. |
| 223,404 | 12/1942 | Switzerland. |
| 934,718 | 1/1948 | France. |

LEO FRIAGLIA, *Primary Examiner.*